(12) United States Patent
Niihara

(10) Patent No.: US 6,256,344 B1
(45) Date of Patent: Jul. 3, 2001

(54) VARIABLE BIT RATE ENCODER

(75) Inventor: Takami Niihara, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/087,198

(22) Filed: May 29, 1998

(30) Foreign Application Priority Data

May 30, 1997 (JP) ................................................ 9-157743

(51) Int. Cl.$^7$ ..................................................... H04N 7/12
(52) U.S. Cl. ...................... 375/240; 375/240.02; 382/251
(58) Field of Search ................... 348/409, 415, 348/384, 390, 419; 375/240

(56) References Cited

U.S. PATENT DOCUMENTS

| 5,475,433 | * 12/1995 | Jeong ..................................... 349/419 |
| 5,526,052 | * 6/1996 | Ar ......................................... 348/405 |
| 5,638,125 | * 6/1997 | Jeong et al. ........................... 348/405 |
| 6,052,417 | * 4/2000 | Fujiwara et al. ...................... 375/240 |

FOREIGN PATENT DOCUMENTS

| 0 700 214 A2 | 3/1966 | (EP) . |
| 0 682 454 A2 | 5/1995 | (EP) . |
| 0 742 674 A2 | 11/1996 | (EP) . |
| 0 742 674 A3 | 9/1998 | (EP) . |
| 3-263927 | 11/1991 | (JP) . |
| 6-165 946 | 1/1996 | (JP) . |
| 7-149 543 | 12/1996 | (JP) . |

OTHER PUBLICATIONS

Adaptive Frame Type Selection for Low Bit–Rate Video Coding Jungwoo Lee and Bradley W. Dickinson XP 002035257 SPIE vol. 2308/1411.

* cited by examiner

*Primary Examiner*—Chris Kelley
*Assistant Examiner*—Shawn S. An
(74) *Attorney, Agent, or Firm*—Anderson, Kill & Olick, P.C.

(57) ABSTRACT

Prior to a coding of a picture information, an information related to the coding in frame unit, an information of the coding mode in macro block unit, an information of the motion vector in macro block unit and an information related to the complexity of picture in macro block unit are produced in a coding unit 2 and stored in an external memory 5. An information of the code apportionment is produced on the basis of these information stored in the external memory 5 and the code is apportioned on the basis of the latter information by a code apportioning unit 6 and the latter information is stored in the external memory 5. A coding of the picture information is performed by using the information related to the coding in frame unit, the information of the coding mode in macro block unit, the information of the motion vector in macro block unit and the information related to the complexity of picture in macro block unit stored in an external memory 5 and an appropriate code apportionment is performed.

3 Claims, 2 Drawing Sheets

VARIABLE BIT RATE ENCODER

BACKGROUND OF THE INVENTION

1. Field of the Invention

The present invention relates to a variable bit rate encoder of MPEG2 used as an encoder for such as authoring of DVD.

2. Description of the Prior Art

In a case where a picture information is processed in digital signals, a large amount of information must be handled. In order to make a recording, a reproduction and a transmission of a picture signal possible with a smaller amount of information, various high efficiency coding systems have been proposed and recording/reproducing devices using these systems have been realized.

In a conventional recording/reproducing device, an amount of data per unit time is generally constant and, therefore, the conventional recording/reproducing device is advantageous in that there is no need of using any special constructions in a recording system, a recording medium and a reproducing system. However, since the recording/reproducing is performed at a constant bit rate, it is impossible to record/reproduce an information of a long time original signal by effectively using a recording capacity of the recording medium.

In order to solve this problem, a high efficiency, variable bit rate coding system has been proposed, which makes an effective use of a recording capacity of a recording medium possible by assigning a small code amount to a portion of the information content of the original signal, which has no influence on restoration of the signal, as code amount per predetermined time and assigning a large code amount to a portion of the information content of the original signal, which has a large influence on restoration of the signal, as code amount per predetermined time.

An example of the conventional encoder according to the high efficiency, variable bit rate coding system will be described. First, a picture signal to be high efficiency-coded is temporarily coded (first coding) to obtain a data of a generation amount of code. Then, a coding condition is set by using the data obtained by the temporary coding such that a true coding (second coding) is performed to obtain an aimed total code amount.

By performing two coding's for one and the same picture signal in this manner, it is possible to generate high efficiency coded data of variable bit rate under the condition of, for example, a predetermined generation code amount.

As another example, an encoder has been proposed, in which an image quality is improved by partially changing an apportioning amount of code according to a result of decoding of the code generated by the second coding in the high efficiency, variable bit rate encoder capable of generating the high efficiency coded data at variable bit rate by the two coding's.

However, since, in the high efficiency encoders mentioned above, quantization is performed differently for the first coding and the second coding, the second coding is performed with motion vector and coding mode which are different from those in the first coding.

In this case, since conditions other than quantization are different between the first coding and the second coding, a prediction error itself changes considerably. Therefore, the code given to the second coding based on the first coding is not used effectively.

Depending upon the result of decoding of the code generated by the second coding, there may be a case where an improvement of image quality is performed by partially changing the apportionment of the amount of code. In such case, however, it is impossible to exactly confirm the change of image quality due to the re-apportionment of the amount of code.

This fact will be described in detail with reference to FIG. 1. In FIG. 1, the re-coding is performed by assigning a larger amount of code to a re-apportioning section of a plurality of GOP's (group-of-picture) including an assigned re-apportioning section, as shown. A construction of GOP, for example GOP1, in MPEG composed of I, P and B pictures is shown in a lower portion of FIG. 1. Incidentally, I picture is a intra coded picture (intra-frame coded picture), P picture is a predictive coded picture (inter-frame forward prediction coded picture) and B picture is a bidirectional predictive coded picture (bi-directional prediction coded picture).

In the above mentioned re-coding, when only GOP1 which is a head of the re-apportioning section is not a closed GOP, there is no reference frame necessary to code B1 and B2 frames of the B picture precedent on a time axis to an I3 frame of the I picture in the GOP1. Therefore, it is impossible to exactly code the B1 and B2 frames of the GOP1. (In FIG. 1, the reference frame necessary to code the B1 and B2 frames of the GOP1 corresponds to a P0 frame of the GOP which is precedent on the time axis to the head GOP1 of the re-apportioning section.) Further, since a large amount of code is necessary to code the B1 and B2 frames, an amount of additional code to be assigned to a later half of the section is reduced. Therefore, it is impossible to exactly confirm the effectiveness of the re-apportionment.

SUMMARY OF THE INVENTION

The present invention was made in view of the above mentioned problems and an object of the present invention is to provide a variable bit rate encoder encoding a picture signal by using a temporary coding information obtained by temporarily coding the picture signal to reflect the temporary coding information exactly to a code apportion, which can visually confirm a picture quality of a decoded picture when the decoded picture of the coded picture signal is reproduced after the coding to visually confirm the reproduced picture and the code apportionment of a portion of a coding period is changed by assigning a section whose picture quality is to be improved.

According to the present invention, a variable bit rate encoder for temporarily coding an information to be high efficiency coded and then coding the information is provided, which comprises means responsive to an information supplied for temporarily coding the information to generate an information related to a coding in frame unit, an information of a coding mode in macro block unit, a motion vector information in macro block unit and an information related to a complexity of picture in macro block unit and storing these information in an external memory, means for generating an information of code apportionment on the basis of these information stored in the external memory and performing a code apportionment and storing the code apportionment information in the external memory and means for performing a coding operation by using the information related to the coding in frame unit, the coding mode information in macro block unit, the motion vector information in macro block unit, the information related to the complexity of picture in macro block unit and the coding apportionment information, which are stored in the external memory.

Further, the present invention provides a variable bit rate encoder which, in changing the code apportionment in the assigned section for the information to be high efficiency coded, changes the code apportionment of a plurality of GOP's in the assigned section and encodes the coding mode information in macro block unit and the motion vector information in macro block unit which are stored in the external memory.

Further, the present invention provides a variable bit rate encoder which, when the first GOP of the plurality of GOP's in the assigned section is not a closed GOP, the coding operation is performed from a first I frame of the first GOP and provides a variable bit rate encoder which, when the first GOP of the plurality of GOP's in the assigned section is not a closed GOP and the first frame of the first GOP is not an I frame, the coding operation is performed from the first GOP with using an original picture of the last frame of a GOP immediately before the first GOP as a reference picture, instead of a locally decoded picture.

DETAILED DESCRIPTION OF THE PREFERRED EMBODIMENTS

Figure 2:
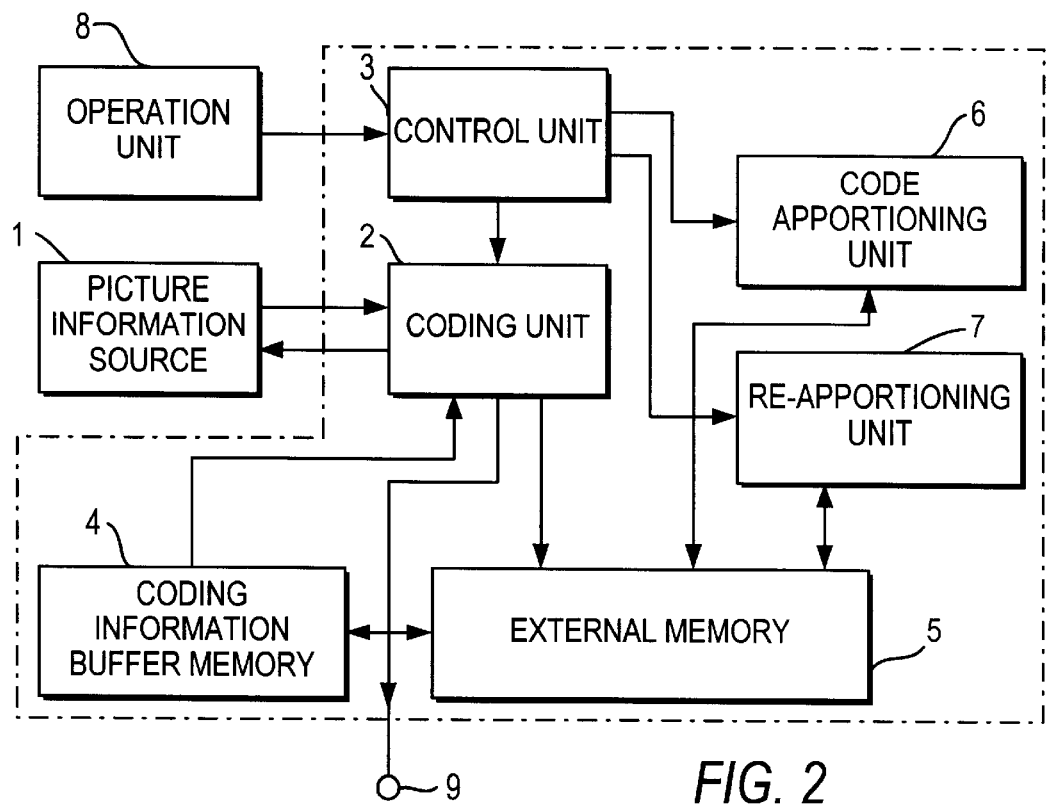
FIG. 2 is a block diagram showing a construction of a variable bit rate encoder according to the present invention.

A variable bit rate encoder according to the present invention will be described in detail with reference to the accompanying drawings. FIG. 2 is a block diagram showing a construction of a variable bit rate encoder of the present invention. In FIG. 2, a reference numeral 1 depicts a picture information source (picture signal source), 2 an encoding unit, 3 a control unit, 4 a buffer memory for coding information, 5 an external memory, 6 a code apportioning unit, 7 a re-apportioning device and 8 an operation unit.

As the picture signal source 1 for supplying the picture information to be high-efficiency coded, a digital VTR may be used.

A user (operator) inputs a preparatory coding information (for example, information of encode start point and encode end point) through input means (for example, key board) provided in the operation unit 8. The preparatory coding information is output from the operation unit 8 to the control unit 3. In the control unit 3, the information necessary for coding, that is, the encode start point and encode end point, etc., is produced on the basis of the preparatory coding information and supplied to the coding unit 2, the code apportionment unit 6 and the re-apportioning unit 7.

The control unit 3 controls the picture information source 1 through the coding unit 2. The picture information (digital picture signal) is supplied from the picture information source 1 to the coding unit 2 under control of the control unit 3.

Prior to a coding of the picture information (digital picture signal) supplied from the picture information source 1, the coding unit 2 performs the following operations (these operations will be referred to as "temporary coding"). In the coding unit 2 which operates under control of the control unit 3, the digital picture signal supplied from the picture information source 1 is transformed by the so-called inverse telecine transformation. Then, a coding mode of respective sequential frames is determined and the motion vector is detected in macro block unit. Further, a determination of the coding mode in macro block unit is performed and an activity representing the complexity of picture is calculated in macro block unit. The result of the inverse telecine transformation which is an information in frame unit, the coding mode, the motion vector in macro block unit, the coding mode in macro block unit and the activity representing the complexity of picture in macro block unit are packed as the temporary coding information, supplied from the coding unit 2 to the external memory 5 constructed with, for example, a hard disk and stored therein.

The temporary coding information stored in the external memory 5 is read out therefrom and supplied to the code apportioning unit 6, under control of the control unit 3. In the code apportioning unit 6, an aimed amount of code to be apportioned is calculated on the basis of the motion vector in macro block unit, the coding mode in macro block unit and the activity representing the complexity of picture in macro block unit of the temporary coding information read out from the external memory 5.

Further, in the code apportioning unit 6, the aimed amount of code calculated by the code apportioning unit 6 is added to the temporary coding information read out from the external memory 5, and a resultant sum is output as the coding information of the picture information and stored in the external memory 5.

In the coding unit 2 which is operated under the control of the control unit 3, the digital picture signal supplied from the picture information source 1 is inverse-telecine transformed and, then, the thus obtained digital picture information of the respective sequential frames are coded. The coding information is read out from the external memory 5 and stored the coding information buffer memory 4. The result of the inverse telecine transformation, which is an information in frame unit, the coding mode, the motion vector in macro block unit, the coding mode in macro block unit and the aimed code amount are in synchronism with the digital picture signal supplied from the picture information source 1. In this synchronized state, the coding unit 2 performs the coding operation on the basis of the respective information supplied from the coding information buffer memory 4 to produce a bit stream. The produced bit stream is stored in the external memory 5 and sent to an output terminal 9.

As described above, since, in the variable bit rate encoder according to the present invention, it is possible to perform both the temporary coding and the coding of the picture information by using the same timing of motion vector, coding mode and inverse telecine transform, the code apportionment is exactly reflected to the code.

Since the code apportionment is performed in the code apportioning unit 6 on the basis of the arithmetic operation, the result of code apportionment does not always satisfy human sense of vision.

Therefore, after the coding operation of the whole digital picture signal is completed, a decoded picture of the whole of the coded digital picture signal is reproduced. The picture quality of the decoded picture is confirmed by eyes and a section whose picture quality is to be improved is assigned. The coding information is rewritten such that the amount of code apportioned to the section is increased (this processing will be referred to as "re-apportioning processing").

Then, the re-coding is performed by using the coding information after the re-apportioning processing. Thus, the picture quality of the decoded picture is improved. In this case, it is necessary to visually confirm for every assigned section an effective apportioning amount of code.

In order to visually confirm the effective amount of code, the coding information corresponding to a plurality of GOP's including the assigned section is extracted from the whole coding information as a partial coding information. The code apportionment of the partial coding information is changed and transmitted to the coding unit 2 as a changed partial coding information. The coding unit 2 performs the coding of the assigned section by using the changed partial coding information. Further, the code produced by this coding is decoded to reproduce the decoded picture and a change of the picture quality of the decoded picture is visually confirmed.

There is no problem in a case where the first GOP of the plurality of GOP's including the assigned section is a closed GOP or the first frame is I frame.

Figure 1:
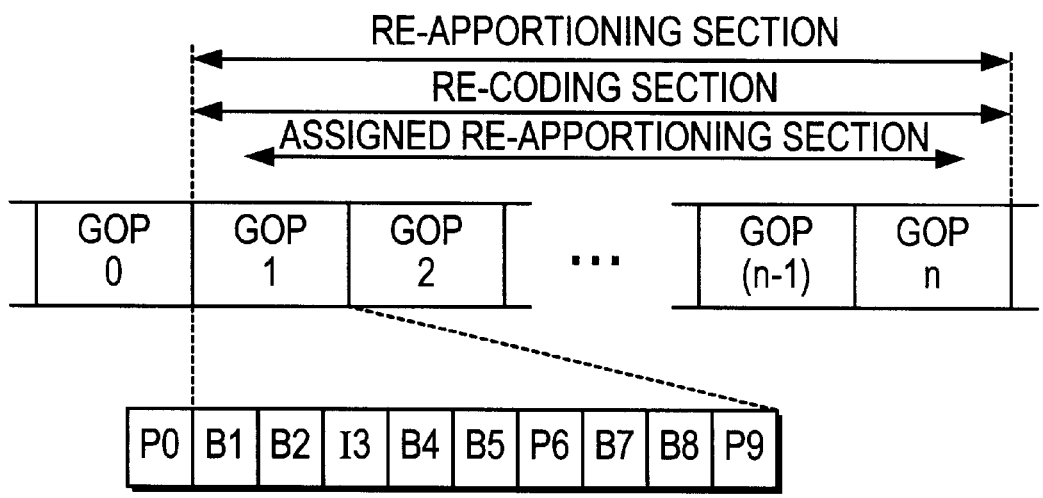
FIG. 1 shows an arrangement of GOP's in a conventional variable bit rate encoder.

When the first GOP1 of the plurality of GOP's including the assigned section is an open GOP and the first frame of the GOP1 is a B frame B1 as shown in FIG. 1, the B frames B1 and B2 preceding the I frame I3 in the GOP 1 are coded without P0 frame to be referenced for coding them.

Therefore, in re-coding the B frames B1 and B2 of the first GOP1, an amount of code more than the code amount to be apportioned originally is necessary. As a result, the amount of code which is usable in frames succeeding the B frames B1 and B2 becomes smaller, causing the picture quality of the succeeding frames to be degraded. Further, the meaning of performing the visual confirmation of the effect of change of the code apportionment becomes less.

The method according to the present invention which can avoid such problem will be described in detail.

In the following description, it is assumed that the first GOP of the plurality of GOP's including the assigned section is not a closed GOP and the first frame thereof is not an I frame.

Figure 3:
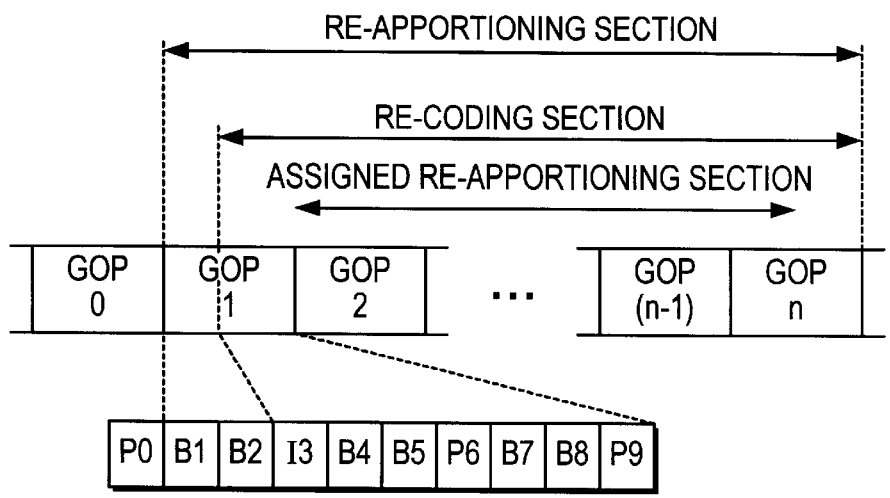
FIG. 3 shows a first arrangement of GOP's for explaining a re-coding.

A first method of the present invention will be described with reference to FIG. 3 which shows a first arrangement of the GOP's.

A predetermined input is performed to the operation unit 8 by the previously mentioned visual confirmation and a re-apportionment assigned section whose code apportionment is to be changed is determined. Therefore, the plurality of GOP's (in FIG. 3, GOP1 to GOPn) within the re-apportionment assigned section are determined as the re-apportionment section. Then, an I frame is searched by referring to the respective frames of the GOP1 from the first frames thereof. In the shown example, the I frame is I3 frame and a section including the I3 frame and frames subsequent to the I3 frame is determined as the re-coding section. The B1 and B2 frames in the re-apportioning section are excluded from the re-coding section.

That is, only the coding information corresponding to the re-apportioning section assigned by the operator through the operation unit 8 is read out in the re-apportioning unit 7 from the coding information stored in the external memory 5, under the control of the control unit 3. The re-apportioning unit 7 performs a re-apportioning processing of the coding information in the re-apportioning section as shown in FIG. 3. Further, a section from the I3 frame of the first GOP1 to the last GOPn of the re-apportioning section is assigned as the re-coding section. The re-apportioning unit 7 produces the coding information in this re-coding section as the partial coding information and stores it in the external memory 5.

The control unit 3 controls the operation of the coding unit 2 such that the coding of the re-coding section is performed.

The coding unit 2 encodes the input picture information (digital picture information) of the re-coding section on the basis of the partial coding information.

Figure 4:
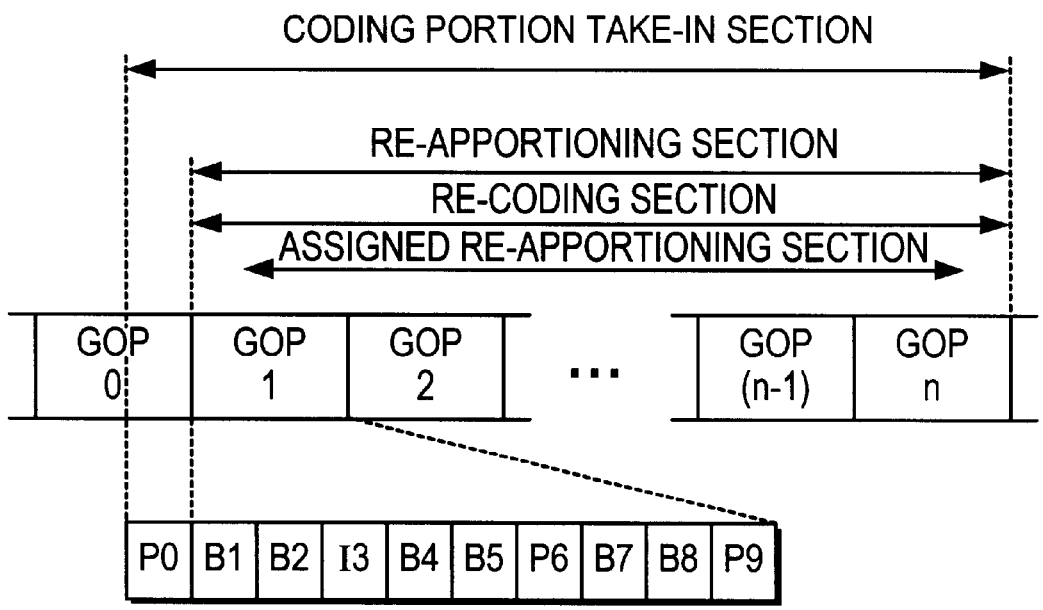
FIG. 4 shows a second arrangement of GOP's for explaining a re-coding.

Now, a second method will be described with reference to FIG. 4 which shows a second arrangement of GOP's.

As mentioned previously, the predetermined input operation is performed to the operation unit 8 on the basis of the visual confirmation and the re-apportioning section whose code apportionment is to be changed is determined. Thus, the plurality of GOP's (in FIG. 4, from GOP1 to GOPn) in the assigned re-apportioning section are determined as the re-apportioning section.

Then, the coding unit 2 references GOP0 immediately preceding the first GOP1 of the re-apportioning section and takes in an original picture of the last frame (frame P0) as the frame of a coding portion take-in section. The coding take-in section is constructed with the frame P0 and the re-apportioning section. The frame P0 is not coded and the re-coding section coincides with the re-apportioning section.

The frame P0 is used as a reference picture in coding the frames B1 and B2 of the first GOP1 of the re-coding section.

That is, under the control of the control unit 3, only the coding information in the re-apportioning section assigned by the operator through the operation unit 8 is read out in the re-apportioning unit 7 from the coding information stored in the external memory 5. The re-apportioning unit 7 performs a re-apportioning processing of the coding information in the re-apportioning section. Now, the re-apportioning section coincides with the re-coding section. The re-apportioning unit 7 produces the coding information in this re-coding section as the partial coding information and stores it in the external memory 5.

The control unit 3 controls the operation of the coding unit 2 such that the coding of the re-coding section is performed.

The coding unit 2 does not perform the coding processing of the first frame P0 of the input picture information in the coding portion take-in section but store it as a frame of the reference picture. The coding unit 2 performs a coding operation by the remaining input picture information, that is, the picture information in the re-coding section and the partial coding information. When the frames B1 and B2 are coded, the P0 frame is referenced.

As described in detail hereinbefore, the variable bit rate encoder according to the present invention performs a temporary coding of a picture signal to obtain a temporary coding information and performs a coding operation by using the temporary coding information so that the temporary coding information is exactly reflected to the coding operation in apportioning code and, after the coding operation is completed, the picture quality of the decoded picture is visually confirmed by reproducing the decoded picture of the whole coded picture signal and, when there is a section in which the picture quality is to be improved, it is assigned. When the code apportionment of a portion of the coding period is changed according thereto, it is possible to visually confirm the picture quality of the decoded picture.

What is claimed is:

1. A variable bit rate encoder for temporarily coding an information to be high-efficiency coded and then coding the information, comprising:

means for temporarily coding the supplied information to generate an information related to a coding in frame unit, an information of a coding mode in macro block unit, a motion vector information in macro block unit and an information related to a complexity of picture in macro block unit and storing these information in an external memory;

means for generating an information of code apportionment on the basis of these information stored in said external memory and performing a code apportionment and storing the code apportionment information in said external memory; and means for performing a coding operation by using the information related to the coding in frame unit, the information of the coding mode in macro block unit, the motion vector information in macro block unit, the information related to the complexity of picture in macro block unit and the coding apportionment information, which are stored in said external memory, wherein, in changing the code apportionment in the assigned section, the code apportionment of a plurality of GOP's in the assigned section is changed and the coding is performed by using the information of the coding mode in macro block unit and the information of the motion vector in macro block unit, which are stored in said external memory.

2. A variable bit rate encoder as claimed in claim 1, wherein, when a first GOP of the plurality of GOP's in the assigned section is not a closed GOP, the coding is performed from a first I frame of the first GOP.

3. A variable bit rate encoder as claimed in claim 1, wherein, when a first GOP of the plurality of GOP's in the assigned section is not a closed GOP and the first frame of the first GOP is not an I frame, the coding is performed from the first GOP with using an original picture of a last frame of a GOP immediately before the first GOP as a reference picture instead of a locally decoded picture.

* * * * *